Nov. 4, 1969  O. M. BERVE ET AL  3,476,913
ELECTRIC SAUNA BATH HEATER
Filed March 25, 1966  2 Sheets-Sheet 1
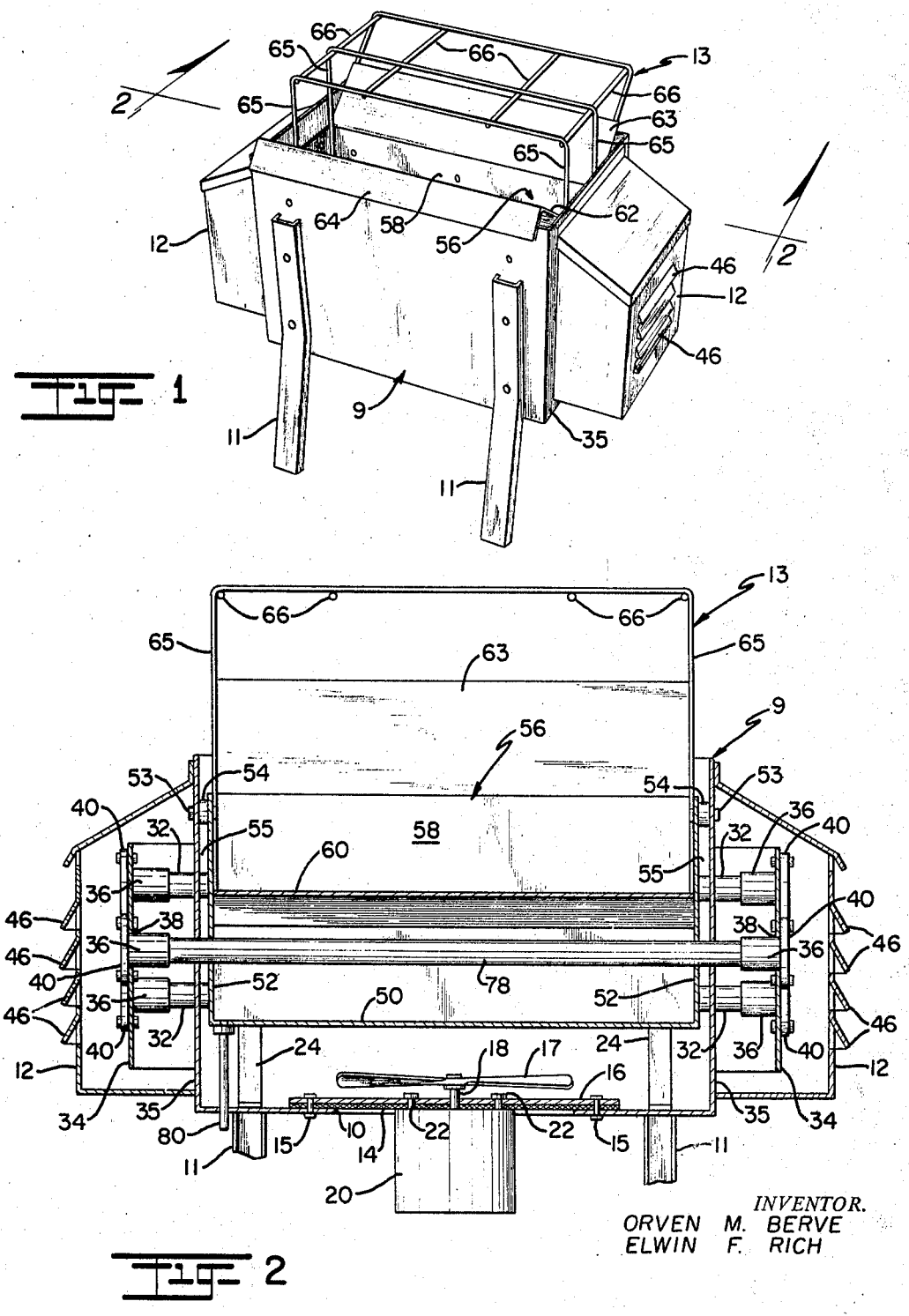
INVENTOR.
ORVEN M. BERVE
ELWIN F. RICH Nov. 4, 1969  O. M. BERVE ET AL  3,476,913
ELECTRIC SAUNA BATH HEATER
Filed March 25, 1966  2 Sheets-Sheet 2
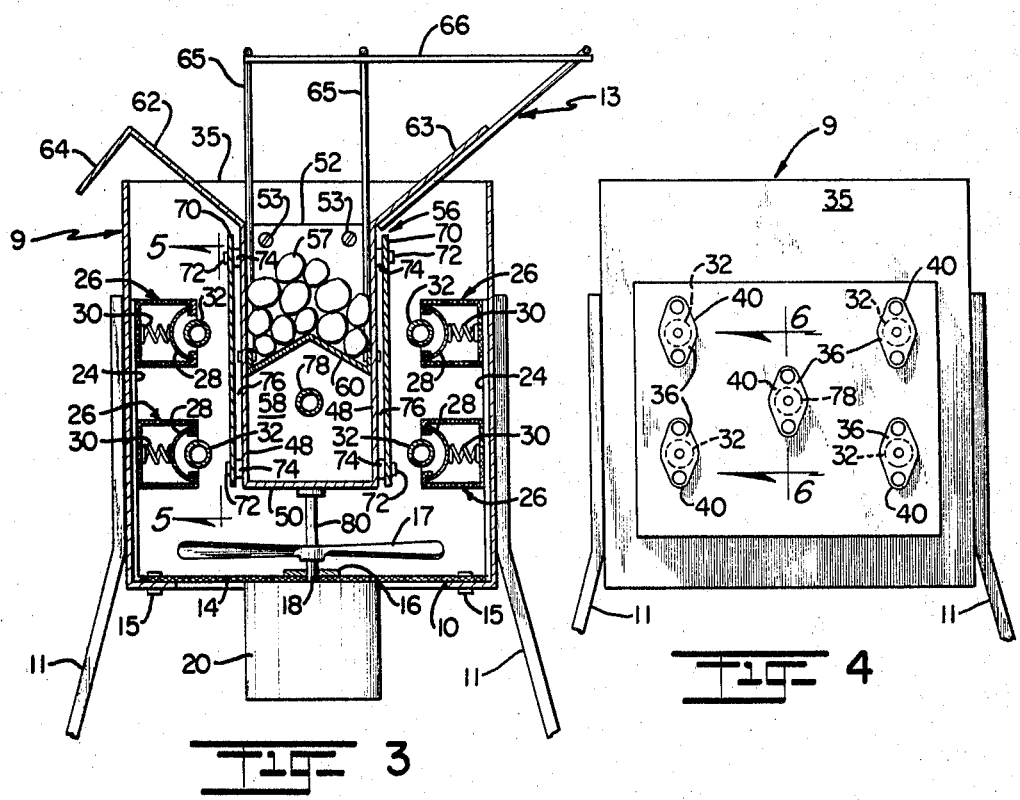
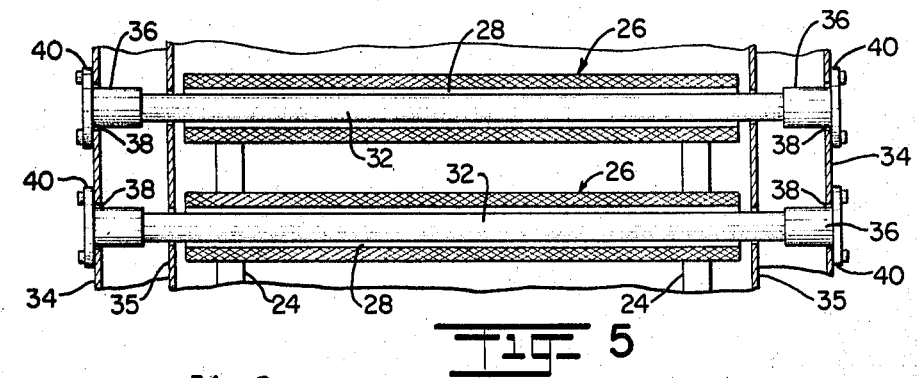
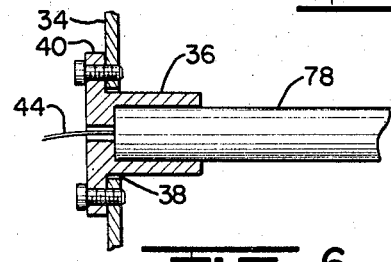
INVENTOR.
ORVEN M. BERVE
ELWIN F. RICH United States Patent Office 3,476,913
Patented Nov. 4, 1969

3,476,913
ELECTRIC SAUNA BATH HEATER
Orven M. Berve, Denver, and Elwin F. Rich, Wheatridge, Colo., assignors to O. M. Berve Company, Denver, Colo., a corporation of Colorado
Filed Mar. 25, 1966, Ser. No. 537,530
Int. Cl. H05b 1/00, 3/02, 11/00
U.S. Cl. 219—365                                3 Claims

ABSTRACT OF THE DISCLOSURE

A sauna bath heater including outer and inner compartments, said inner compartment having an upper rock receiving chamber and a lower heating chamber. A housing circumscribes at least a portion of the outer compartment. A heat shield having inner and outer surfaces is mounted in the outer compartment and disposed in spaced apart relation with respect to the inner compartment and the housing. A first radiant heating means is located within the outer compartment intermediate the heat shield and said housing. Heat reflector means for reflecting the heat away from said housing toward said heat shield is located between said first radiant heating means and said housing and spaced apart from said housing. Second radiant heating means is located within said lower chamber. The sauna bath heater also includes means for forcing air upwardly through said outer compartment along the surfaces of said heat shield and intermediate the heat reflector means and said housing.

---

This invention relates to a hot air bath characterized by high temperature and low humidity, known as a sauna bath and, more particularly, to a heater for sauna baths. Generally speaking, sauna baths are provided with heaters which furnish an atmosphere of hot dry air by their operation in which forced air is passed through a heated area. The humidity of the air is controlled by steam produced by contact of water with hot stones in a rock basket in the heater, the heater providing heat to heat air as well as to heat the rocks.

It is an object of this invention to provide a heater for sauna baths which is extremely compact in construction so that a minimum of space will be occupied by it in the room where the sauna baths are to be taken.

It is another object of this invention to provide a sauna bath heater in which a high efficiency heat utilization is realized.

It is another object of this invention to provide a sauna bath heater in which maximum heating of air rocks is effected with a minimum heating of the outside jacket or housing of the heater.

It is another object of this invention to provide a sauna bath heater in which maximum heat output is attained in a minimum amount of time.

It is a further object of this invention to provide a sauna bath heater construction incorporating an efficient air ducting system.

The above and other objects are accomplished by a sauna bath heater construction comprising an outer housing provided with openings at the top and bottom to permit air circulation therethrough, a fan for forcing air upwardly through the housing, radiant heater units mounted adjacent the internal side walls of the housing extending longitudinally thereof and provided with individual heat shielding and reflecting means, a rock basket located centrally of the housing with an inner heating compartment adjacent its bottom, and shielding means adjacent the outer sides of the rock basket and the inner heating compartment. Air ducts are formed on either side of the rock basket leading to baffles or deflectors which direct heated air outwardly from the housing. The heat shields on either side of the rock basket are spaced apart from the outer walls of the rock basket and inner heating compartment so that an air duct is formed between them and said outer walls to provide for a maximum heated surface for heating air.

The invention is best explained in detail by reference to the accompanying drawings in which:

FIG. 1 is a perspective view of the heating unit of this invention;

FIG. 2 is a longitudinal cross-section taken on line 2—2 of FIG. 1;

FIG. 3 is a transverse cross-section of the heating unit;

FIG. 4 is an end view of the heating unit;

FIG. 5 is a fragmentary partial sectional view taken on line 5—5 of FIG. 3; and

FIG. 6 is a fragmentary partial sectional view taken on line 6—6 of FIG. 4.

Referring to FIG. 1, the heater unit is comprised of outer rectangular-shaped housing or jacket 9 preferably of rectangular shape and made of stainless steel or other equivalent material. It is open at the top and is provided with a rectangular opening 10 in its bottom. The housing 9 is supported on legs 11, preferably of metal, angled outwardly as shown to provide stability for the housing unit. Louvered hoods 12 are mounted at either end of the housing 9. A rack 13 in the form of a grill is mounted in the housing 9 and is for the purpose of preventing contact with the hot rocks in the rock basket. The specific construction of the units 9, 12 and 13 will be described hereinafter.

Reference will now be made to FIGURES 2–6 for a description of the detailed construction of the heating unit. A screen 14 is mounted over the opening 10 in the bottom of the housing 9 by means of bolts 15 and support plate 16. As shown in FIG. 3, the support plate 16 has a width much less than that of the screen 14 and is located centrally of the screen and extends longitudinally thereof. The purpose of the screen and the opening in the bottom of the housing is to permit air to be drawn into the interior of the housing. A fan 17 of any suitable type with the required number and type of blades is mounted on shaft 18 centrally of screen 14. The fan is driven by a suitable motor 20 mounted by means of mounting bolts 22 on support plate 16.

In order to reinforce the outer housing and provide a mounting for certain elements, a pair of U-shaped reinforcing members 24 (FIG. 2) are welded or otherwise secured internally of the housing and extend vertically thereof.

As shown in FIG. 3, rectangularly shaped lamp brackets 26 extending longitudinally of the housing 10 are mounted on U-shaped reinforcing members 24 on either side of the housing by welding or other suitable means. For the purposes of illustration two are used on either side; however, any required number may be used depending upon the preferred number of heating units to be used. Supported within each of the brackets is an individual curved heat shield and reflector 28 of suitable metal having its edges fitted in bracket-like recesses of the lamp brackets as shown. The shields or reflectors 28 are spring-biased into position by means of springs 30. The brackets 26 support the heat reflector 28 in the required position to reflect heat inwardly and shield the housing from it. Each bracket is of screen-like construction as shown or perforated to permit air being drawn through the housing to circulate over the back of the heat reflector and between the heat reflector and the base of bracket. Outer heating units 32 are each supported, in a manner to be described later, adjacent a heat shield and reflector 28 so that each heating unit 32 is provided with an individual heat shield and reflector. The heating units are preferably quartz infrared heating tubes.

Rectangularly shaped end brackets 34 (FIG. 2) are welded or otherwise secured to the outer end plates 35 of the housing 9. Lamp sockets 36 for receiving the ends of the heating tubes and supporting them in position are supported in holes 38 in the end brackets by means of flanges 40 secured to the end bracket by screws as shown. The tubes can, of course, be removed and replaced by removal of one end bracket. The heating units are provided with electrical supply by means of connectors represented by connector 44 leading to a suitable source of electrical supply of standard construction, not shown. The electrical supply for the thermostatic control of the lamps, being standard, is also not shown in the drawings.

End hoods 12 are secured to either end of the housing 9 by welding or otherwise. They are located over end brackets 34 and are provided with louvers 46 for the admission of cool air to circulate around the brackets 34 to cool the ends of the heating tubes. If desired, openings may be provided in the end walls of the jacket, under the hoods near the top thereof to permit air to circulate from the hoods into the interior of the housing 9 to be heated.

The construction of the rock basket and internal heating compartment will now be described. Side plates 48 of stainless steel or other suitable metal extending longitudinally of the housing are mounted in substantially parallel relationship and are integrally secured to bottom 50 and ends 52 to form an inside compartment. The ends 52 of the inside compartment are secured by bolts 53 to the ends 35 of the housing 9. Spacer units 54 are provided between the ends 52 of the inside compartment and the ends 35 of the housing 9 to form end channel 55 at either end of the housing. The described construction permits upwardly travelling air to circulate completely around all surfaces of the inside compartment.

A rock basket 56 for holding rocks 57, and an inner heating compartment 58, are formed by centrally located V-shaped transverse wall 60. This wall forms the bottom of the rock basket 56 and the top of the inner heating compartment 58.

Hot air baffles or deflectors 62 and 63 are secured to the top edges of side plates 48 and may be made integral with the side plates. They are angled ts shown to deflect upwardly traveling hot air outside of the housing. Deflector 62 is provided with a downwardly extending extension 64 at its end to direct hot air downwardly after it leaves the housing.

The rack 13 is constructed in the form of a grill as shown with vertical and horizontal cross-stays 65 and 66, respectively, and its vertical stays 65 are secured by welding or otherwise at their ends to the inside surfaces of side plates 48 for support.

Longitudinally extending heat shields 70 in the form of flat plates made of stainless steel or other suitable material extend longitudinally of side plates 48 and are secured thereto by means of bolts 72 and expansible spacers 74 to form channels 76 between the heat shields 70 and the side plates 48. This construction shields the rock basket and inner heating compartment from direct heat from the heating units so that heat is not thereby disspiated in unnecessary heating, and it provides a large area of heating surface for heating upwardly traveling air, the heating surface being comprised of the outer surfaces of side plates 48 and both the inner and the outer surfaces of heat shields 70.

A central heating unit 78, preferably a quartz infrared tube, is mounted centrally in inner heating compartment 58 by means of end bracket 34 (FIG. 4) in the same manner as outer side heating tubes 32 are mounted in the end plate by means of sockets 36 and flanges 40. The inner heating compartment is located directly below the rock basket 56 to provide effective heating of the rocks in the basket. Further, in a small room, or in the event a minimum amount of heat is required for some other reason, this heating compartment can be used alone. It can also be used under special conditions where a minimum circulation of hot air is required. An overflow or drain pipe 80 extends from the bottom 50 of the inner heat compartment 58 down through the bottom of housing 10 to drain any excess moisture which may seep out of inner heating compartment 58.

In operation, with the heating tubes plugged into a suitable electrical supply, and the fan operating, relatively cool air is drawn into housing 9 through screen 14 by means of fan 17 and portions of the air drawn in travel through various channels to the top of the housing where the various air currents are combined and the mixed air deflected on either side by the deflectors 62 and 63. Portions of the upwardly directed air pass through channels formed between the outer heat tubes 32 and the outer surfaces of heat shields 70 where they are subjected to direct contact with the extensive outer surfaces of the heat shields and the heat tubes 32 themselves. Other portions of the air pass upwardly through channels 76 between the outer surfaces of side plates 48 and the inner surfaces of heat shields 70 where they are effectively heated by contact with the large heating surface comprised of the inner surfaces of heat shields 70 and the outer surfaces of side plates 48. Still other portions of the heated air pass upwardly through the perforated brackets 26 where they contact the individual heat shields 28 to absorb heat therefrom and pass on up to deflectors 62 and 63. This latter outside current of air is cooler than the internal currents and serves to aid in keeping the outer jacket cool enough to prevent skin burns if contacted by an individual. Some air in reaching the three channels outlined above will, of course, pass underneath the inner heating compartment 58 and contact the bottom 50 to absorb heat herefrom. Air will also travel from the fan upwardly around the ends 52 of the inner heating compartment and through channels 55 where it will contact the heated ends 52 of the lower heating compartment and the rock basket. It is thus seen that a blanket of cooler air is formed entirely around the internal structure of the heater and adjacent the internal surface of the housing, this cooler air being mixed at the top of the housing by means of the deflectors 62, 63 with internal currents of hotter air before it leaves the heater. When only a small amount of heat is necessary the inner heating compartment may be used alone. The heater is thermostatically controlled by standard thermostats, not shown, connected to suitable standard electrical supply, not shown, so that the side heating tubes may all cut out but one to control the temperature of the room in which the heating unit is located. Various arrangements for thermostatically controlling the operation of the heating units can be used.

A number of advantages stem from the describer construction of the sauna bath heater described. For example, the structure in which the outside heating tubes are mounted on either side of the rock basket and including the inner heating compartment produces a compact device providing for travel of air being heated over a maximum amount of heated surfaces. These surfaces include those encountered by travel of air through the channel 76 including the sides 48 of the rock basket and inner heating compartment, the outside surfaces of the heat shields 70, the heated bottom 50 of the inner heating compartment and ends 52 of the inner heating compartment and the rock basket. The provision of an inner heating compartment directly below the rock basket with its individual heating element provides for highly effective and rapid heating of the rocks 57 in the rock basket 56. A further advantage stems from the provision of an inner heating compartment in that this compartment can be used alone depending upon the amount and type of heat required. The provision of individual heat shields or reflectors 28 for each of the outside heating units 32 results in a highly efficient utilization of the heat produced by the heating units in that heated air contacts a minimum of reflector surface to provide a maximum of reflection as distinguished from the effect produced by one large heat reflector for all tubes in which heat is dissipated by traveling over an excess area of reflector surface. These individual shields are effective in protecting outer housing 9 from heat. This feature along with the outer blanket of circulating air adjacent the housing keeps the housing cool enough to prevent skin burns if contacted by one using the sauna bath. The provision of perforated support brackets 26 resulting in the passage of cooler air over the back of the individual reflectors provides effective and efficient concurrent cooling of the reflectors and heating of the air before it passes into the room. The overall construction including the quartz infrared heating tubes produces maximum heat output in a minimum time.

It is thus seen from the above description of the construction and operation of the sauna bath heater of this invention, that it provides maximum efficiency for the heating of air in a simple and compact structure. It is comprised of a minimum of parts and is constructed to provide maximum absorption of heat from heated parts to heat the air passing through it. Its construction provides a maximum of heated surface to provide effective heating of air traveling through it.

It will be understood that other modifications than those disclosed are possible without departing from the spirit of our invention or the scope of the claims.

We claim:

1. A sauna bath heater comprising: outer and inner compartments, said inner compartment having an upper rock receiving chamber and a lower heating chamber; a housing circumscribing at least a portion of said outer compartment; a heat shield having inner and outer surfaces, said heat shield being mounted in said outer compartment and disposed in spaced apart relation with respect to said inner compartment and said housing; first radiant heating means located within said outer compartment intermediate said heat shield and said housing; heat reflector means for reflecting the heat away from said housing toward said heat shield, said heat reflector means being located between said first radiant heating means and said housing and spaced apart from said housing; second radiant heating means located within said lower chamber; and means for forcing air upwardly through said outer compartment along the surfaces of said heat shield and intermediate the heat reflector means and said housing.

2. A sauna bath heater as described in claim 1 in which said housing includes louvered openings to permit air to flow into said outer compartment, and said sauna bath heater includes deflecting baffles extending upwardly and outwardly from said inner compartment to collect all of the air traveling upwardly through said outer compartment and deflect it angularly away from said housing.

3. A sauna bath heater as described in claim 2 in which said first radiant heating means comprises a plurality of quartz infrared heating tubes, each of said tubes having a heat reflector means disposed intermediate thereof and the adjacent portion of said housing.

References Cited

UNITED STATES PATENTS

| | | | |
|---|---|---|---|
| 1,706,515 | 3/1929 | Barber | 219—369 |
| 1,716,791 | 6/1929 | Ness | 219—370 |
| 2,654,018 | 9/1953 | Sanberg | 219—378 |
| 2,709,214 | 5/1955 | Engdahl et al. | 219—365 |
| 2,844,699 | 7/1958 | Miskella | 219—357 X |
| 2,919,338 | 12/1959 | Covault et al. | 219—365 |
| 2,938,101 | 5/1960 | Borzner | 219—365 |
| 3,348,021 | 10/1967 | Skogland et al. | 219—370 |

FOREIGN PATENTS

| | | |
|---|---|---|
| 958,137 | 9/1949 | France. |
| 892,950 | 10/1953 | Germany. |
| 948,633 | 9/1956 | Germany. |
| 884,956 | 12/1961 | Great Britain. |

ANTHONY BARTIS, Primary Examiner

U.S. Cl. X.R.

4—160; 126—344; 219—342, 367, 370, 376